No. 794,811. PATENTED JULY 18, 1905.
M. C. NIXON.
HORSE POWER BALING PRESS.
APPLICATION FILED JAN. 5, 1901.
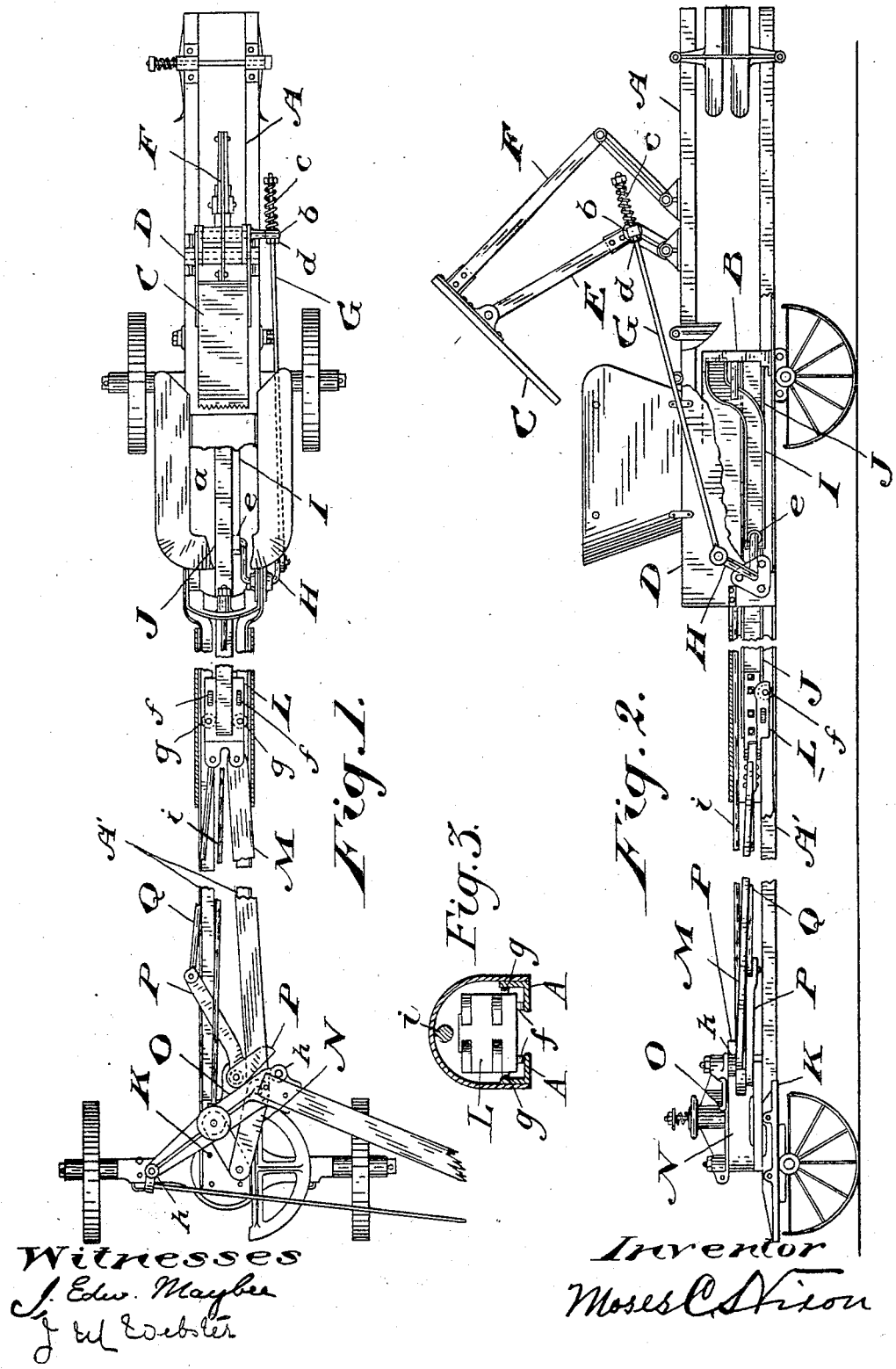

No. 794,811. Patented July 18, 1905.

UNITED STATES PATENT OFFICE.

MOSES C. NIXON, OF FORT WAYNE, INDIANA.

HORSE-POWER BALING-PRESS.

SPECIFICATION forming part of Letters Patent No. 794,811, dated July 18, 1905.

Application filed January 5, 1901. Serial No. 42,223.

*To all whom it may concern:*

Be it known that I, MOSES C. NIXON, of the city of Fort Wayne, in the county of Allen and State of Indiana, have invented certain new and useful Improvements in Horse-Power Baling-Presses, of which the following is a specification.

My invention relates to continuous or perpetual presses operated by horse-power; and the object of my invention is to provide improved means for returning the plunger after its forward stroke, to provide the plunger with an advantageous antifriction-jointed pitman, and to provide simple and efficient means for operating the feeder; and it consists, essentially, in the details of construction hereinafter more specifically described and then definitely claimed.

Figure 1 is a plan view of my improved machine, and Fig. 2 is a side elevation of the same. In both views parts are broken out to shorten the length of the drawings and parts are shown partly broken away to better illustrate the interior construction. Fig. 3 is a cross-section through the frame connecting the power end of the machine with the baling-chamber, showing the method of supporting the carriage of the pitman-shaft.

In the drawings like letters of reference indicate corresponding parts in the different figures.

A is the frame or body of the machine, suitably constructed to support the different parts and preferably mounted on a suitable running-gear, as shown.

The general construction of the machine is old and well known, and hence need not be particularly described. It is provided with the usual plunger B and feeder C.

Upon the top of the baling-chamber D, between the feed-opening $a$ and the discharge end of the press, are secured suitable brackets, to which is pivotally attached the feeder-arm E, preferably bent, as shown, for the purpose of carrying the connection at ear $b$ farther back to admit of a better application of the power when the feeder is in its downward position. The other end of the feeder-arm is preferably pivotally connected to the feeder C, as shown.

To the top of the baling-chamber behind the feeder-arm is pivoted the jointed arm F, the other end of which is rigidly secured to the feeder for the purpose of suitably guiding the latter in its motions.

At some distance above the point at which the feeder-arm is pivoted to the top of the baling-chamber is pivotally attached an extending ear $b$. Through the said ear is loosely passed an operating-rod G. Upon the outer end of this operating-rod is screwed a nut or other spring-retaining device, and between the nut and the ear is located the coil-spring $c$ to act as a relief-spring. At the other side of the ear a nut $d$ is screwed upon the operating-rod or other suitable stop or device provided, giving the necessary connection between the operating-rod and the ear when the feeder-arm is to be thrown up. The opposite end of the operating-rod G is connected to one arm of the bell-crank lever H. The other arm of this lever lies within the body of the press and preferably carries a roller $e$ journaled thereon, which rides within a suitable grooved operating-cam I, secured to the plunger-shaft J of the plunger B, which is reciprocated as hereinafter described.

In operation the material to be baled is placed within the feed-hopper. Then as the plunger or plunger-shaft carrying the cam recedes the roller $e$ rides within the straight part of the cam until the plunger is nearly withdrawn, leaving an open chamber under the material to be fed into the press, when the grooved part of the cam comes in contact with the roller, carrying it upward and forward, which rocks the bell-crank and causes its outer arm to draw on the operating-rod G, causing the feeder to descend and carry the material to be baled down into the baling-chamber. When the plunger is carried on its forward stroke to bale the charge, the cam causes the bell-crank lever to reverse its movement, raising the feeder out of the way of the advancing plunger and allowing the material to be pressed to be again fed into the hopper.

The relief-spring $c$, already described, is intended to relieve the strain on the apparatus in case there is more material placed within the feed-hopper than the adjustment of the feeder will admit or in case some solid substance should be caught under the feeder. The spring will then give and obviate the breakage of some part of the apparatus.

Of course I do not wish to limit myself to the precise construction of the operating mechanism for the feeder, as various changes might be made which would fall within the scope of my invention. Variations particularly might be made in the arrangement of the cam and bell-crank which it operates.

A' is the frame connecting the power K and the baling-chamber D, and which in this case consists, as will be seen, of angle-irons.

One end of the plunger-shaft J is connected with the plunger, and the other has a carriage L secured thereto. This carriage may be of any desired construction, but is provided with one or more antifriction-rollers $f$, adapted to ride upon the bottom parts of the connecting-frame, and one or more rollers $g$, adapted to engage the sides of the frame. Of course the frame at this point could be made U-shaped or a square tube, in which case the precise location of the rollers $f$ and $g$ would not be so important.

The end of the carriage L is provided with suitable lugs. To one of these lugs is pivotally attached the pitman M. The other end of said pitman is pivotally attached to the end of the toggle N, suitably pivotally connected at its other end to a portion of the frame at the power end of the machine. Journaled at its middle at this end of the machine is the power-arm O, to which is connected the usual sweep for the horses, which travel in a circle, stepping over the connecting-frame of the machine at each circuit.

The toggle N is operated by rollers $h$, suitably journaled below the ends of the power-arm O. These engage the toggle, force it into the position shown in the drawings, and then pass by its end. This gives the forward motion to the pitman and plunger. While it is generally expected that the force of rebound caused by the expansion of the material being pressed will carry the plunger back and at the same time cause the feeder to become operative, this force is sometimes insufficient not only to operate the feeder, but even to return the plunger, thus causing considerable loss of time and annoyance. To obviate this objection, I have devised the positive withdrawal device illustrated.

In proximity to the end of the toggle N when the latter is in the position shown in the drawings is journaled a bell-crank lever P, having its arms preferably located at different levels to give the necessary room for the tie-rod $i$, which connects the power end of the machine with the baling-chamber, as shown; but of course the arrangement of the bell-crank lever is a matter of convenience only, as the tie-rod might be differently arranged.

The upper end of the bell-crank lever is so placed and is of such a length that the rollers $h$ of the cross-arm after leaving the toggle will engage it and pass, thus rocking the bell-crank lever sufficiently far to withdraw the plunger and return the toggle to such a position that it may be engaged by the next roller $h$. By connecting the other arm of the bell-crank lever with the carriage L by means of the draw-rod Q this movement is effected.

It will be seen that if the expansion of the material being baled is sufficient to return the plunger the rollers of the power-arm will not engage the bell-crank lever P; but if this power is not sufficient to return the plunger or only sufficient to carry it a part of the way the rollers will engage the bell-crank lever and return the plunger to its proper position. The chief advantage claimed for the arrangement of this improved jointed pitman is that the machine is narrower where the team steps over it and that the plunger works steadily forward and backward in alinement without twisting or sidewise strain to cause friction or jamming. The rollers of the carriage at the joint of the pitman and plunger-shaft effectually relieve any friction caused by the weight of the parts or the sidewise thrust of the pitman, which otherwise at the beginning of the stroke would be considerable. Besides, this jointed pitman makes it possible to attach to the plunger-shaft the cam that operates the feeder, which would not be practical if the plunger-shaft was operated at an angle which is continually changing.

What I claim as my invention is—

1. In a baling-press, a plunger and pitman suitably connected with one another, in combination with a toggle pivotally connected at one end to a stationary part, and at the other to the end of the pitman; a power-arm centrally journaled on a suitable stationary part; a projecting roller at each end of the power-arm adapted to engage and pass the toggle; a bell-crank lever suitably pivoted within the circle described by the said rollers and arranged so that one arm is in a position to be engaged and passed by each roller of the power-arm after it has passed the toggle; and a draw-rod pivoted to the other arm of the bell-crank lever and suitably connected with the plunger.

2. In a baling-press the combination of a frame; a feeder-arm pivoted on the frame; a feeder carried by the said arm; an extending lug pivoted on said arm; an operating-rod connected with the said lug; a suitably-pivoted bell-crank lever to one arm of which the said operating-rod is also connected; a suitably-grooved cam with which the other arm of the bell-crank lever is adapted to engage; and means for reciprocating the said cam simultaneously with the movements of the plunger of the machine so that the bell-crank lever is rocked to oscillate the feeder.

3. In a baling-press the combination of a frame; a feeder-arm pivoted on the frame; a feeder carried by the said arm; an extending lug pivoted on said arm; an operating-rod connected with the said lug; a suitably-pivoted bell-crank lever to one arm of which the said operating-rod is also connected; a roller journaled on the end of the other arm of the bell-crank lever; a cam suitably grooved to engage the said roller; and a plunger-shaft to which the said cam is connected.

4. In a baling-press the combination of a frame; a feeder-arm pivoted on the frame; a feeder carried by the said arm; an operating-rod pivotally connected with the said arm; a suitably-pivoted bell-crank lever to one arm of which the said operating-rod is also connected; a suitably-grooved cam with which the other arm of the bell-crank lever is adapted to engage; and means for reciprocating the said cam simultaneously with the movements of the plunger of the machine so that the bell-crank lever is rocked to oscillate the feeder.

5. In a baling-press the combination of a frame; a feeder-arm pivoted on the frame; a feeder carried by the said arm; an extending lug pivoted on said arm; an operating-rod passing through the said lug, a nut or other spring-retainer on the end of the pitman; a coil-spring between the nut and the lug; a suitable stop on the operating-rod on the other side of the lug; a suitably-pivoted bell-crank lever to one arm of which the said operating-rod is also connected; a suitably-grooved cam with which the other arm of the bell-crank lever is adapted to engage; and means for reciprocating the said cam simultaneously with the movements of the plunger of the machine so that the bell-crank lever is rocked to oscillate the feeder.

6. In a baling-press, a plunger and pitman suitably connected with one another; in combination with a power-arm suitably journaled; means for causing the rotation of the power-arm to throw the pitman forward; a projection on the power-arm; a bell-crank lever suitably pivoted within the circle described by said projection so that one arm is in position to be engaged and passed by the projection of the power-arm after the pitman has been thrown forward; and a draw-rod pivoted to the other arm of the bell-crank lever and suitably connected with the plunger.

7. In a baling-press, a plunger and pitman suitably connected with one another, in combination with a power-arm suitably journaled; a projection on the power-arm; a lever suitably pivoted within the circle described by said projection so that one part thereof is in position to be engaged and passed by said projection after said plunger has been thrown forward; and suitable connections between said lever and plunger to actuate the latter.

8. In a baling-press, a baling-chamber having a feed-opening and plunger therein; a feeder adapted to feed material into said chamber; a power-arm suitably journaled and having means in connection therewith to throw the plunger forward; a projection on the power-arm; a lever suitably pivoted within the circle described by said projection so that one part thereof is in position to be engaged and passed by said projection after the plunger has been thrown forward; and means in connection with said lever to actuate said plunger and feeder.

9. In a baling-press, a baling-chamber having a feed-opening and plunger therein; a feeder acting in said feed-opening; a power-arm suitably journaled and having means in connection therewith to actuate the plunger; a projection on the power-arm; a lever suitably pivoted within the circle described by said projection so that one part thereof is in position to be engaged and passed by said projection after the plunger has been thrown forward; and an actuating relation between said lever and feeder.

Toronto, January 3, 1901.

MOSES C. NIXON.

In presence of—
 J. Edw. Maybee,
 John G. Ridout.